(12) United States Patent
Flowers et al.

(10) Patent No.: US 10,810,593 B1
(45) Date of Patent: Oct. 20, 2020

(54) HEURISTIC ACCOUNT FRAUD DETECTION ENGINE

(71) Applicant: STATE FARM MUTUAL AUTOMOBILE INSURANCE COMPANY, Bloomington, IL (US)

(72) Inventors: Elizabeth Flowers, Bloomington, IL (US); Puneit Dua, Bloomington, IL (US); Eric Balota, Bloomington, IL (US); Shanna L. Phillips, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 133 days.

(21) Appl. No.: 15/495,659

(22) Filed: Apr. 24, 2017

Related U.S. Application Data

(60) Provisional application No. 62/368,548, filed on Jul. 29, 2016, provisional application No. 62/368,271, filed on Jul. 29, 2016, provisional application No. 62/368,298, filed on Jul. 29, 2016, provisional application No. 62/368,332, filed on Jul. 29, 2016, provisional application No. 62/368,359, filed on Jul. 29, 2016, provisional application No. 62/368,406, filed on Jul. 29, 2016, provisional application No. 62/368,448, filed on Jul. 29, 2016, provisional application No. 62/368,503, filed on Jul. 29, 2016, provisional application No. 62/368,512, filed on Jul. 29, 2016, provisional application No. 62/368,525, filed on Jul. 29, 2016, provisional application No. 62/368,536, filed on Jul. 29, 2016, provisional application No. 62/368,572, filed on Jul. 29, 2016, provisional application No. 62/368,588, filed on Jul.

(Continued)

(51) Int. Cl.
*G06Q 20/24* (2012.01)
*G06Q 20/40* (2012.01)

(52) U.S. Cl.
CPC ......... *G06Q 20/4016* (2013.01); *G06Q 20/24* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS 6,658,393 B1 12/2003 Basch et al.
7,765,557 B2 * 7/2010 Young .................... G06Q 10/10
705/38

(Continued)

OTHER PUBLICATIONS

Jeffords et al., "New Technologies to Combat Check Fraud", The CPA Journal. (Year: 1999).*

(Continued)

*Primary Examiner* — Frantzy Poinvil
(74) *Attorney, Agent, or Firm* — Lee & Hayes, P.C.

(57) ABSTRACT

A heuristic engine includes capabilities to collect an unstructured data set and detect instances of transaction fraud in a financial account. By providing a heuristic algorithm with unstructured transaction sets and indications of particular instances of transactions that correlate with past fraudulent activity allows prevention of future occurrences of fraud. Such heuristic algorithms may learn from past indications of fraudulent activity and improve accuracy of detection of future fraud detections.

20 Claims, 9 Drawing Sheets

Related U.S. Application Data 29, 2016, provisional application No. 62/337,711, filed on May 17, 2016, provisional application No. 62/335,374, filed on May 12, 2016.

(56) References Cited

U.S. PATENT DOCUMENTS

| | | | |
|---|---|---|---|
| 7,870,431 B2 | 1/2011 | Cirne et al. | |
| 8,019,678 B2* | 9/2011 | Wright | G06Q 20/04 705/35 |
| 8,117,097 B2 | 2/2012 | Abbott | |
| 8,135,633 B1* | 3/2012 | LeBaron | G06Q 20/10 705/30 |
| 8,217,396 B2* | 7/2012 | Yamazaki | H01L 27/12 257/72 |
| 8,271,396 B2 | 9/2012 | Ronning et al. | |
| 8,560,390 B2 | 10/2013 | Higgins et al. | |
| 8,600,873 B2* | 12/2013 | Fisher | G06Q 10/0635 705/38 |
| 8,615,520 B2 | 12/2013 | Fallah | |
| 8,635,117 B1* | 1/2014 | Acuna-Rohter | G06Q 20/4016 705/26.35 |
| 8,688,579 B1 | 4/2014 | Ethington et al. | |
| 8,732,023 B2* | 5/2014 | Mikurak | G06Q 50/12 705/22 |
| 8,775,299 B2 | 7/2014 | Achanta et al. | |
| 8,781,962 B2* | 7/2014 | Vasten | G06Q 20/105 705/41 |
| 8,811,711 B2 | 8/2014 | Calman et al. | |
| 8,826,155 B2* | 9/2014 | Dixon | G06Q 10/06 715/760 |
| 8,838,474 B2 | 9/2014 | Macy et al. | |
| 8,842,331 B1 | 9/2014 | Enge | |
| 8,885,963 B2 | 11/2014 | Coleman | |
| 8,892,461 B2* | 11/2014 | Lau | H04W 12/06 705/14.66 |
| 8,996,411 B2 | 3/2015 | Thomas | |
| 9,117,117 B2 | 8/2015 | Macciola et al. | |
| 9,349,145 B2 | 5/2016 | Rozman et al. | |
| 9,473,634 B1 | 10/2016 | Ouimette et al. | |
| 9,942,250 B2 | 4/2018 | Stiansen et al. | |
| 2002/0194117 A1 | 12/2002 | Nabe et al. | |
| 2003/0074328 A1 | 4/2003 | Schiff et al. | |
| 2004/0036961 A1* | 2/2004 | McGuire, Jr. | G02B 17/08 359/344 |
| 2004/0039691 A1* | 2/2004 | Barratt | G06Q 20/04 705/39 |
| 2005/0091524 A1 | 4/2005 | Abe et al. | |
| 2006/0212386 A1 | 9/2006 | Willey et al. | |
| 2006/0253578 A1* | 11/2006 | Dixon | G06Q 10/06 709/225 |
| 2007/0168285 A1* | 7/2007 | Girtakovskis | G06Q 10/107 705/50 |
| 2008/0255891 A1 | 10/2008 | Stone | |
| 2009/0049550 A1 | 2/2009 | Shevchenko | |
| 2010/0222053 A1 | 9/2010 | GiriSrinivasaRao et al. | |
| 2010/0332287 A1 | 12/2010 | Gates et al. | |
| 2011/0047071 A1 | 2/2011 | Choudhuri et al. | |
| 2011/0071857 A1 | 3/2011 | Malov et al. | |
| 2011/0131125 A1 | 6/2011 | Lawrence et al. | |
| 2011/0178901 A1 | 7/2011 | Imrey et al. | |
| 2011/0191250 A1* | 8/2011 | Bishop | G06Q 20/3821 705/67 |
| 2011/0225138 A1 | 9/2011 | Johnston | |
| 2011/0262536 A1 | 10/2011 | Jordan et al. | |
| 2011/0295722 A1 | 12/2011 | Reisman | |
| 2011/0306028 A1 | 12/2011 | Galimore | |
| 2011/0307258 A1 | 12/2011 | Liberman et al. | |
| 2012/0116972 A1 | 5/2012 | Walker | |
| 2012/0158541 A1 | 6/2012 | Ganti et al. | |
| 2012/0158573 A1 | 6/2012 | Crocker | |
| 2012/0158574 A1 | 6/2012 | Brunzell et al. | |
| 2012/0259722 A1 | 10/2012 | Mikurak | |
| 2012/0262461 A1 | 10/2012 | Fisher et al. | |
| 2013/0018796 A1 | 1/2013 | Kolhatkar et al. | |
| 2014/0006166 A1 | 1/2014 | Chiang et al. | |
| 2014/0081832 A1 | 3/2014 | Merrill et al. | |
| 2014/0214654 A1* | 7/2014 | Greenbaum | G06Q 20/00 705/39 |
| 2014/0222631 A1 | 8/2014 | Love et al. | |
| 2014/0236829 A1* | 8/2014 | Ganti | G06Q 20/40 705/44 |
| 2014/0249872 A1 | 9/2014 | Stephan et al. | |
| 2014/0270145 A1 | 9/2014 | Erhart et al. | |
| 2014/0278839 A1* | 9/2014 | Lynam | G06Q 20/3276 705/13 |
| 2014/0324564 A1 | 10/2014 | Walker et al. | |
| 2014/0337083 A1 | 11/2014 | Goyal et al. | |
| 2015/0106265 A1 | 4/2015 | Stubblefield et al. | |
| 2015/0117747 A1 | 4/2015 | Smith et al. | |
| 2015/0142595 A1 | 5/2015 | Acuna-Rohter | |
| 2015/0142713 A1 | 5/2015 | Gopinathan et al. | |
| 2015/0201077 A1 | 7/2015 | Konig et al. | |
| 2015/0235240 A1 | 8/2015 | Chang et al. | |
| 2015/0254719 A1 | 9/2015 | Barfield, Jr. et al. | |
| 2015/0278944 A1 | 10/2015 | Searson et al. | |
| 2015/0287026 A1 | 10/2015 | Yang et al. | |
| 2016/0042359 A1 | 2/2016 | Singh | |
| 2016/0044054 A1 | 2/2016 | Stiansen et al. | |
| 2016/0055184 A1 | 2/2016 | Fokoue-Nkoutche et al. | |
| 2016/0098705 A1* | 4/2016 | Kurapati | G06Q 20/3574 705/41 |
| 2016/0132886 A1 | 5/2016 | Burke et al. | |
| 2016/0179877 A1 | 6/2016 | Koerner et al. | |
| 2016/0180726 A1 | 6/2016 | Ahuja et al. | |
| 2016/0225076 A1 | 8/2016 | Merrill et al. | |
| 2016/0373891 A1 | 12/2016 | Ramer et al. | |
| 2017/0041464 A1 | 2/2017 | Sharma | |
| 2017/0236125 A1* | 8/2017 | Guise | G06O 20/4016 705/17 |

OTHER PUBLICATIONS

Kingston et al., "Towards a financial fraud ontology: A legal modelling approach", Artificial Intelligence and :Aw (2004) 12 : 419-446, DOI 10.1007/s10506-005-4163-0) (Year: 2006).*

Zask, "Finding financial fraudsters: Quantitative and behavioural finance approaches", Journal of Securities Operations & Custody, vol. 6 No. 4, pp. 308-324, (Year: 2014).*

U.S. Appl. No. 15/495,549, Heuristic Identity Authentication Engine, Flowers et al., filed Apr. 24, 2017.

U.S. Appl. No. 15/495,579, "Heuristic Context Prediction Engine", Flowers et al., filed Apr. 24, 2017.

U.S. Appl. No. 15/495,594, "Natural Language Virtual Assistant", Flowers et al., filed Apr. 24, 2017.

U.S. Appl. No. 15/495,603, "Heuristic Money Laundering Detection Engine", Flowers et al., Apr. 24, 2017.

U.S. Appl. No. 15/495,621, "Heuristic Credit Risk Assessment Engine", Flowers et al., Apr. 24, 2017.

U.S. Appl. No. 15/495,648, "Heuristic Document Verification and Real Time Deposit Engine", Flowers et al., filed Apr. 24, 2017.

U.S. Appl. No. 15/495,659, "Heuristic Account Fraud Detection Engine", Flowers et al., filed Apr. 24, 2017.

U.S. Appl. No. 15/495,678, "Natural Language Troubleshooting Engine", Flowers et al., filed Apr. 24, 2017.

U.S. Appl. No. 15/495,693, "Cross Selling Recommendation Engine", Flowers et al. filed Apr. 24, 2017.

U.S. Appl. No. 15/495,699, "Book of Business Impact Assessment Engine", Flowers et al., filed Apr. 24, 2017.

U.S. Appl. No. 15/495,716, "Process Re-Design Targeting Engine", Flowers et al., filed Apr. 24, 2017.

U.S. Appl. No. 15/495,724, "Financial Literacy Mentoring Assistant Engine", Flowers et al., filed Apr. 24, 2017.

U.S. Appl. No. 15/495,743, "Heuristic Sales Agent Training Assistant", Flowers et al., filed Apr. 24, 2017.

Bishop, "Pattern Recognition and Machine Learning", Springer Science, 2006, 758 pages.

Final Office Action dated Jan. 7, 2020 for U.S. Appl. No. 15/495,699 "Book of Business Impact Assessment Engine" Flowers, 26 pages.

(56) References Cited

OTHER PUBLICATIONS

Office Action for U.S. Appl. No. 15/495,603, dated Dec. 9, 2019, Flowers,"Heuristic Money Laundering Detection Engine", 20 Pages.
Jaroslav, et. al., "Internal Model of Commercial Bank as an Instrument for Measuring Credit Risk of the Borrower in Relation to Financial Performance (Credit Scoring and Bankruptcy Models)", Journal of Competitiveness, Iss. 4, 2011, pp. 104-120.
Final Office Action dated Jan. 22, 2020 for U.S. Appl. No. 15/495,743 "Heuristic Sales Agent Training Assistant" Flowers, 9 pages.
Final Office Action dated May 26, 2020 for U.S. Appl. No. 15/495,603 "Heuristic Money Laundering Detection Engine" Flowers, 12 pages.
Non Final Office Action dated May 29, 2020 for U.S. Appl. No. 15/495,699 "Book of Business Impact Assessment Engine" Flowers, 14 pages.
Boldi, et. al., "Query Suggestions Using Query-Flow Graphs", Proc. of the 2009 Workshop on Web Search Click Data, 2009, pp. 56-63.
Madaan, et. al., "A Data Mining Approach to Predict Users' Next Question in QA System", 2015 2nd International Conference on Computing for Sustainable Global Development, pp. 211-215.
Ng'Ambi, "Pre-empting User Questions through Anticipation—Data Mining FAQ Lists", Proc. of the 2002 Annual Research Conference of the South African Institute of Computer Scientists and Information Technologists on Enablement through Technology, 2002, pp. 101-109.
Non Final Office Action dated Jun. 11, 2020 for U.S. Appl. No. 15/495,678 "Natural Language Troubleshooting Engine" Flowers, 15 pages.
Sordoni, "A Hierarchical Recurrent Encoder-Decoder for Generative Context-Aware Query Suggestion", Proc. of the 24th ACM International Conference on Information and Knowledge Management, 2015, pp. 553-562.
Tyler, et. al., "Large Scale Query Log Analysis of Re-Finding", Proc. of the 3rd ACM International Conference on Web Search and Data Mining, 2010, pp. 191-200.

\* cited by examiner

HEURISTIC ACCOUNT FRAUD DETECTION ENGINE

CROSS-REFERENCE TO RELATED APPLICATIONS

This application claims the benefit of U.S. Provisional Patent Application Nos. 62/337,711 and 62/335,374, filed respectively on May 12, 2016 and May 17, 2016, and U.S. Provisional Application Nos. 62/368,448, 62/368,406, 62/368,359, 62/368,588, 62/368,572, 62/368,548, 62/368,536, 62/368,525, 62/368,512, 62/368,503, 62/368,332, 62/368,298, 62/368,271, filed on Jul. 29, 2016, the disclosures of which are hereby incorporated herein by reference.

FIELD OF THE INVENTION

The disclosure generally relates to systems, methods, apparatus, and non-transitory computer readable media to detect account fraud in unstructured transaction sets using heuristic algorithms.

BACKGROUND

Organizations involved in customer service activities often process large amounts of unstructured data to make decisions while interacting with a customer in real-time. For example, in the case of a customer service representative speaking on the telephone with a customer experiencing an issue with a product or service, appropriate solutions may include a combination of timeliness of response and accuracy in content.

Such unstructured data may include voluminous transaction records spanning decades, unstructured customer service data, or real-time transcripts of customer service interactions with scattered contextual indicators. To reasonably expect a customer service representative to effectively leverage such large data sets in real-time places an unreasonable burden on a customer service representative. However, failing to do so robs the customer service representative of vital context not readily apparent, and the wealth of knowledge gained throughout the history of an organization that would otherwise need to be distilled to briefing materials and expensively trained over time. Thus, organizations may value tools to rapidly process large data sets, to infer context, suggest lessons learned based upon transaction data, while learning through successive process iterations. Furthermore, appropriate application of such tools may provide a competitive advantage in a crowded and competitive customer service industry.

In an effort to automate and provide better predictability of customer service experiences, many organizations develop customer relationship management (CRM) software packages. Organizations that develop these software packages often develop custom solutions, at great expense, to best meet the needs of their customers in unique industries. Such tools while providing a great level of detail for the customer service representative, lack the flexibility to react to changing business conditions or fully exploit the underlying technology, driving additional cost into an already expensive solution.

Some organizations where able to make concessions on customized solutions turn to off-the-shelf or commercially available software solutions that reduce the overall cost of implementation. Such solutions may provide customer service representative prompting tools with question and answer formats that allow for consistency of customer experience, however, at the expense of a less personalized experience required in many industries. While more flexible than fully-custom solutions, the impersonal question-answer format of customer interaction may not improve without costly software revisions, rarely performed by original equipment manufacturers (OEMs) of off-the-shelf solutions.

The ability for a customer service experience to learn and improve over successive iterations remains paramount for organizations to offer discriminating customer service experiences. Often the burden of continual improvement falls to the customer service representative, as a human being able to adapt and learn to changing conditions more rapidly even within the confines of a rigid customer service software application. However, with the advent of outsourcing prevalent in the customer service industry, the customer service representative may lack much of the necessary context required to provide high levels of relevant customer service. This lack of context in an interconnected company is less an issue of distance and more an issue of data access and the ability to contextually process data to present relevant solutions in a timely manner.

SUMMARY

One exemplary embodiment includes a computer-implemented method, executed with a computer processor, to authenticate a customer identity. The method may include retrieving an un-structured transaction data set, receiving an encoded context, and/or accessing and executing a heuristic algorithm using the data set and the context. The algorithm may output an authentication score, a suggested set of authentication questions, and/or a suggested set of authentication answers based upon the data set and the context and update the algorithm in the second memory and the context using a correlation factor between the suggested authentication answers and a customer response. The method may include additional, less, or alternate actions or functionality, including that discussed elsewhere herein.

Still another embodiment includes a computer-implemented method, executed with a computer processor, that generates an indication of money laundering activity. This embodiment includes retrieving an un-structured transaction set comprising aggregated transaction data that includes a plurality of users and at least one indication of prior money laundering activity, receiving a plurality of financial transactions, and/or accessing and executing a heuristic algorithm to generate a predicted indication of money laundering activity using the transaction set and the plurality of financial transactions. Such an embodiment may subsequently generate a compliance report using the predicted indications of money laundering activity. The method may include additional, less, or alternate actions, including those discussed elsewhere herein.

Further exemplary embodiments include a computer-implemented method, executed with a computer processor, that verifies documentation in a financial deposit transaction. The method may include retrieving, with the processor, a plurality of document image data. At least one of the data may include an indication of document fraud. The method may include receiving a customer document image associated with a deposit account transaction, and/or accessing and executing a heuristic algorithm to generate a correlation between the image characteristics of the customer document image and at least one of the document image data. The method may also include receiving a notification of actual fraud associated with the customer document image and/or updating the algorithm using the correlation and the notification. The method may include additional, less, or alternate actions, including those discussed elsewhere herein.

Another embodiment includes a computer-implemented method, executed with a computer processor, that generates an indication of fraudulent transaction activity within a financial account. The method may include retrieving an un-structured transaction set comprising aggregated transaction data that includes a plurality of users and at least one indication of fraudulent transaction activity and receiving a plurality of financial transactions. The method may also include accessing and executing a heuristic algorithm to generate a predicted indication of fraudulent account activity using the transaction set and the plurality of financial transactions. The method may include additional, less, or alternate actions, including those discussed elsewhere herein.

Exemplary embodiments may include computer-implemented methods that may in other embodiments include apparatus configured to implement the method, and/or non-transitory computer readable mediums comprising computer-executable instructions that cause a processor to perform the method.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein.

The Figures depict preferred embodiments for purposes of illustration only.

Alternative embodiments of the systems and methods illustrated herein may be employed without departing from the principles of the invention described herein.

DETAILED DESCRIPTION

Various embodiments of the present disclosure include the collection of unstructured data sets together with a current context. Heuristic algorithms processing these unstructured data sets together the context may allow calculation of a future context, and the presentation of context relevant data that improves over time. By subsequently training the heuristic algorithm with the outcome of a current and future predicted context, and the relevance of presented data, the heuristic algorithm may improve its efficiency as the unstructured data set grows.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

IDENTITY AUTHENTICATION

Figure 1:
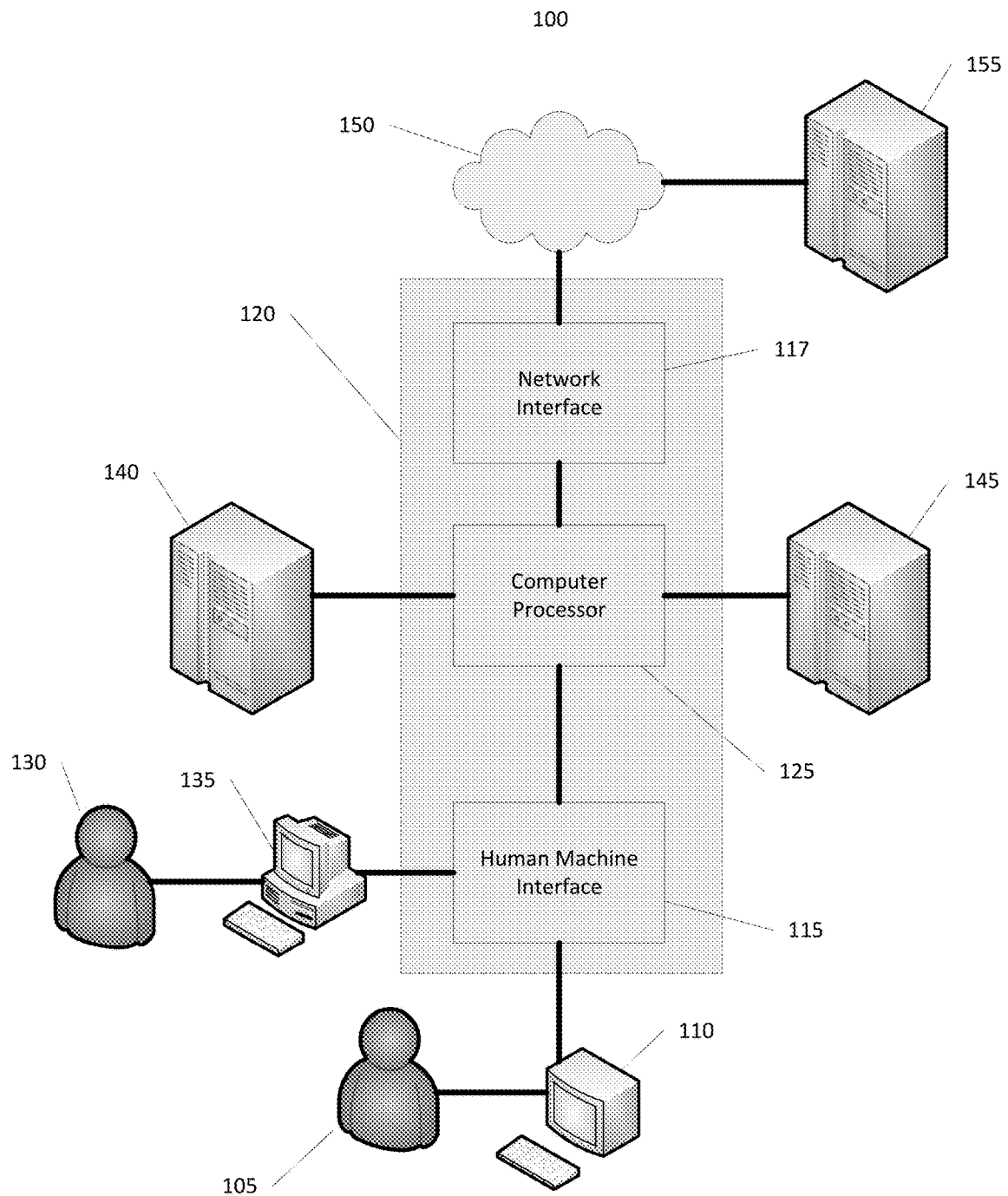
FIG. 1 illustrates an exemplary computer system to authenticate a customer in accordance with one aspect of the present disclosure.

FIG. 1 illustrates a block diagram of an exemplary system 100 to authenticate a customer identity in a financial transaction. The exemplary system 100 enables a user 105 to interface with a user terminal 110 to transmit a request for a transaction that may require an identity authentication. Such an request may, in one embodiment, result from an earlier initiation by a customer service representative 130, interfacing with a service terminal 135, interacting through a human-machine interface 115. In another embodiment, the financial transaction may result from a user initiated request, absent the representative 130.

The human-machine interface 115 may encode the customer 105 and representative 130 interactions with the respective user terminals 110 and service terminal 135 to encode a context in an electronic format, such that a processor 125 reads the context. The processor 125 may in one embodiment include a single processor, or in another embodiment include a variety of interconnected processors that operate in concert to efficiently perform tasks in parallel. The processor 125 may, in one embodiment, interface to a heuristic server 140, and a transaction server 145, storing respectively, a heuristic algorithm and a set of transaction data. In other embodiments, the heuristic algorithm and/or transaction data may reside on the same server.

The computer processor 125 includes an interface to a network interface 117, that may in one embodiment include wired and wireless interfaces to allow communication over any variety of computer networks communicating over a variety of mediums. One such embodiment includes an interface to a network 150, for example a wide-area network such as the Internet, that interconnects any number of computing devices, for example a remote transaction and/or heuristic server 155, over wired or wireless networks, or over one or more radio frequency links or wireless or digital communication channels. In another embodiment, the network 150 may comprise a local-area network with access controls to a specific entity, such as a business.

In one embodiment, a heuristic engine 120, may comprise the human-machine interface 115, computer processor 125, and network interface 117. However, in other embodiments the heuristic engine 120 may include other digital and analog interface devices, memory devices, and supplemental processing devices for performing calculations and storing data.

Figure 2:
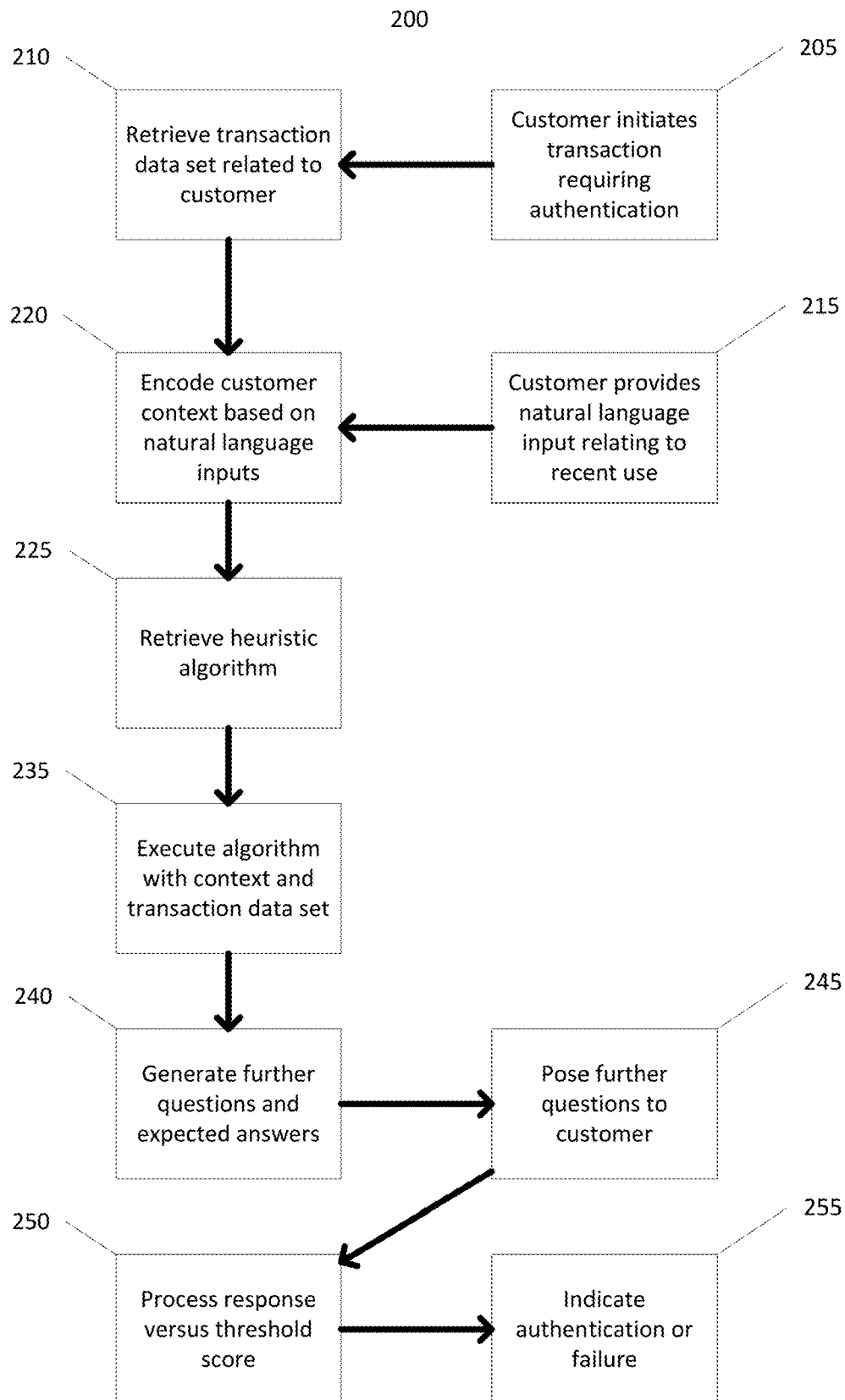
FIG. 2 illustrates an exemplary computer-implemented method to authenticate a customer in accordance with one aspect of the present disclosure.

In accordance with one aspect of the present disclosure, the system 100 may perform the method 200, as illustrated in FIG. 2. However, the method 200 does not, or may not, specifically require the system 100, or the elements included therein in a particular arrangement, to perform the method steps illustrated in the process 200.

In one embodiment, a customer, for example the customer 105 of FIG. 1, may initiate a transaction that may require authentication at step 205. At step 210, a system, for example the the heuristic engine 120 of FIG. 1, may retrieve a transaction data set related to the customer. The customer may provide additional natural language input relating to recent account use at step 215. The heuristic engine 120 may, at step 220, encode a context based the natural language input from step 215, or otherwise, together or in isolation with the transaction data set from step 210. At step 225, a processor, for example the processor 125 of FIG. 1, may retrieve a heuristic algorithm from the heuristic server 140, or otherwise. In one embodiment, the processor 125 may execute the heuristic algorithm with the context and the transaction data set at step 235.

At step 240, in one embodiment, the processor 125 may generate further questions and expected answers, for example using the heuristic algorithm, using the available data. A customer service representative, such as the representative 130 of FIG. 1, may pose further questions to the customer 105, for example using the terminal 135 and terminal 110. The processor 125 may process a response from the customer 105 and compare the response against a threshold score to determine an authentication result. Such a threshold score may indicate a level of authentication required to perform the transaction initiated at step 205, or otherwise. At step 255, the representative 130 may indicate to the customer 105 success or failure of authentication, or in another embodiment, take subsequent action appropriate given the context of the customer service interaction.

MONEY LAUNDERING DETECTION

Figure 3:
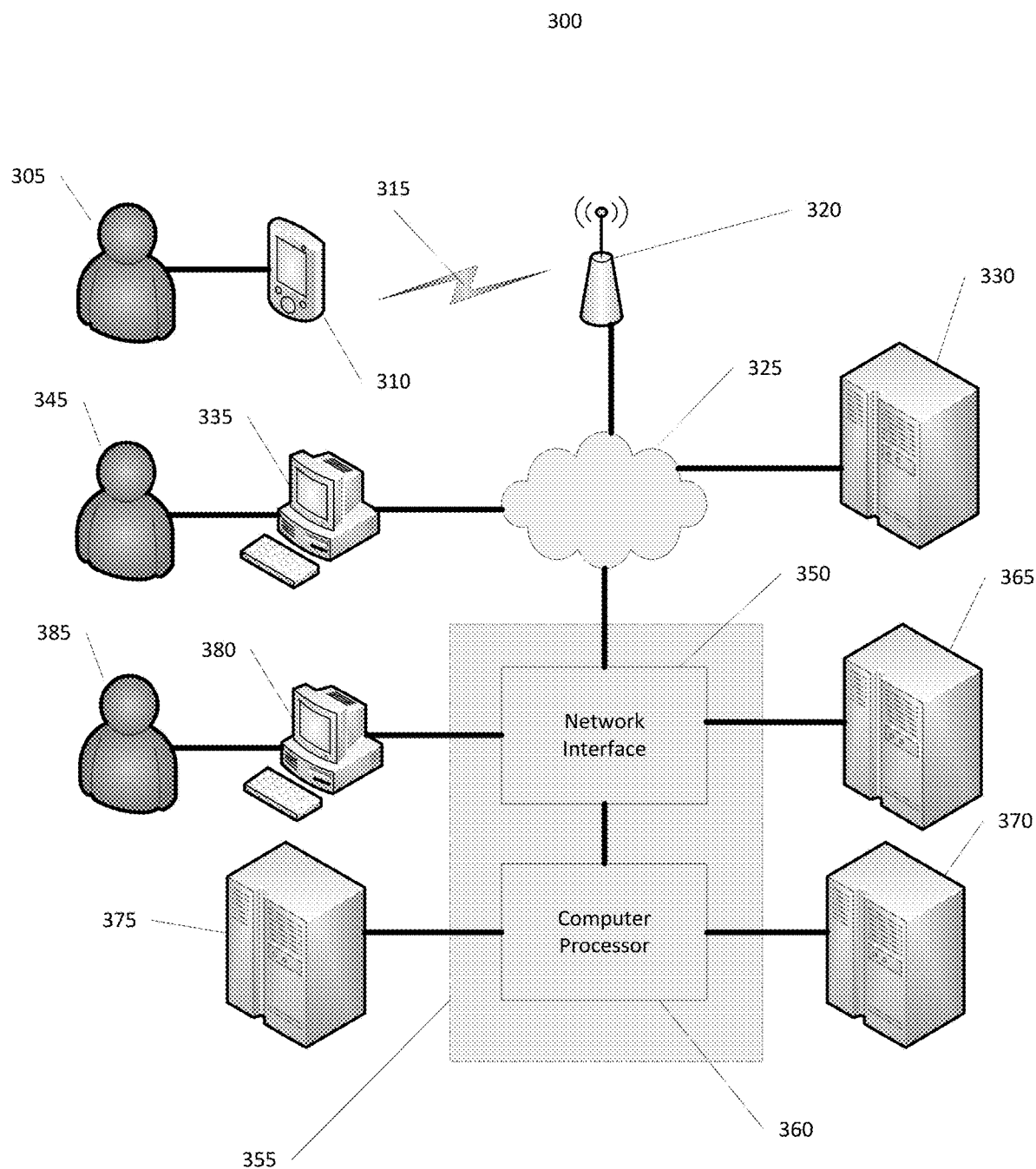
FIG. 3 illustrates an exemplary computer system to detect money laundering in accordance with one aspect of the present disclosure.

FIG. 3 illustrates a block diagram of an exemplary computer system 300 to generate an indication of money laundering activity. The exemplary system 300 enables a user 305 to interface with a mobile device 310 to perform a transaction and allows at least one customer service representative 345 and/or 385, to receive an indication of money laundering activity. Such a request may, in one embodiment involve an earlier initiation by a customer service representative 345 and/or 385, interacting with either of the service terminals 335 and 380. In another embodiment, the transaction may result from a user initiated request, absent the representatives 345 and 385.

The customer may in one embodiment communicate using the mobile device 310 through any of a variety of wireless communication protocols 315 using a wireless access point 320 that implements such protocols and translates communications into a computer readable format. The wireless access point 320 may connect to a network 325, for example the Internet or a corporate intranet, that likewise interfaces to a remote server 330 and a service terminal 335 accessible to a customer service representative 345, such as via wireless communication or data transmission over one or more radio frequency links, or wireless or digital communication channels.

In one exemplary embodiment, a heuristic engine 355 may include a network interface 350 that communicatively couples to the network 325, and a computer processor 360. In other embodiments, the heuristic engine 355 may include a variety of memory devices, interface devices, and processing devices, to execute required functions. The network interface 350 may include interfaces to a database server 365 and a service terminal 380 used by a customer service representative 385. The computer processor 360 may communicatively couple to a heuristic server 370 and transaction server 375.

Figure 4:
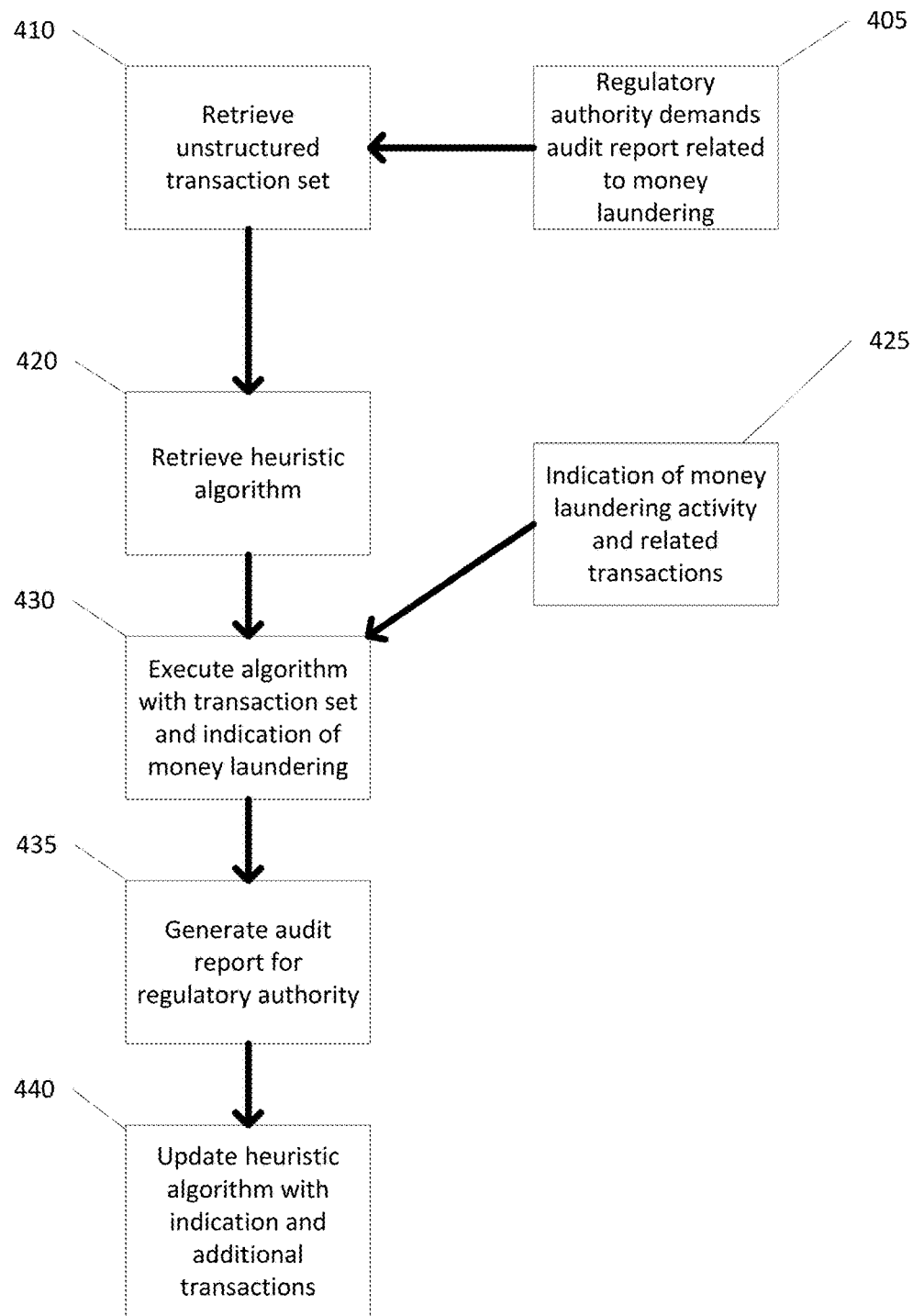
FIG. 4 illustrates an exemplary computer-implemented method to detect money laundering in accordance with one aspect of the present disclosure.

In accordance with one aspect of the present disclosure, the system 300 may perform the method 400, as illustrated in FIG. 4. However, in one embodiment, the method 400 may not, or does not, specifically require the system 300, nor do the elements included therein require a particular arrangement, to perform the method steps illustrated in the process 400.

Method 400 may include a regulatory authority demanding an audit report related to money laundering activity on a particular account (block 405). In one embodiment, a user, such as the user 305 from FIG. 3, initiates a request for an audit report using a mobile device, such as mobile device 310. In one embodiment, the processor 360 may retrieve an unstructured transaction set from the remote server 330, the database server 365, or the transaction server 375. The processor 360 may retrieve a heuristic algorithm from the heuristic server 370 (block 420). In one embodiment, the processor 360 may generate an indication of money laundering activity related to one or more transactions, for example transactions stored in the transaction server 375.

The processor 360 may execute the algorithm with the retrieved transaction set and the indication of money laundering activity (block 430). In one exemplary embodiment, the processor 360 may generate an audit report for a regulatory authority. The processor 360 may update the algorithm stored in the heuristic server 370 (block 440), for example using the indication and additional transactions identified as comprising money laundering activity.

DOCUMENT VERIFICATION

Figure 5:
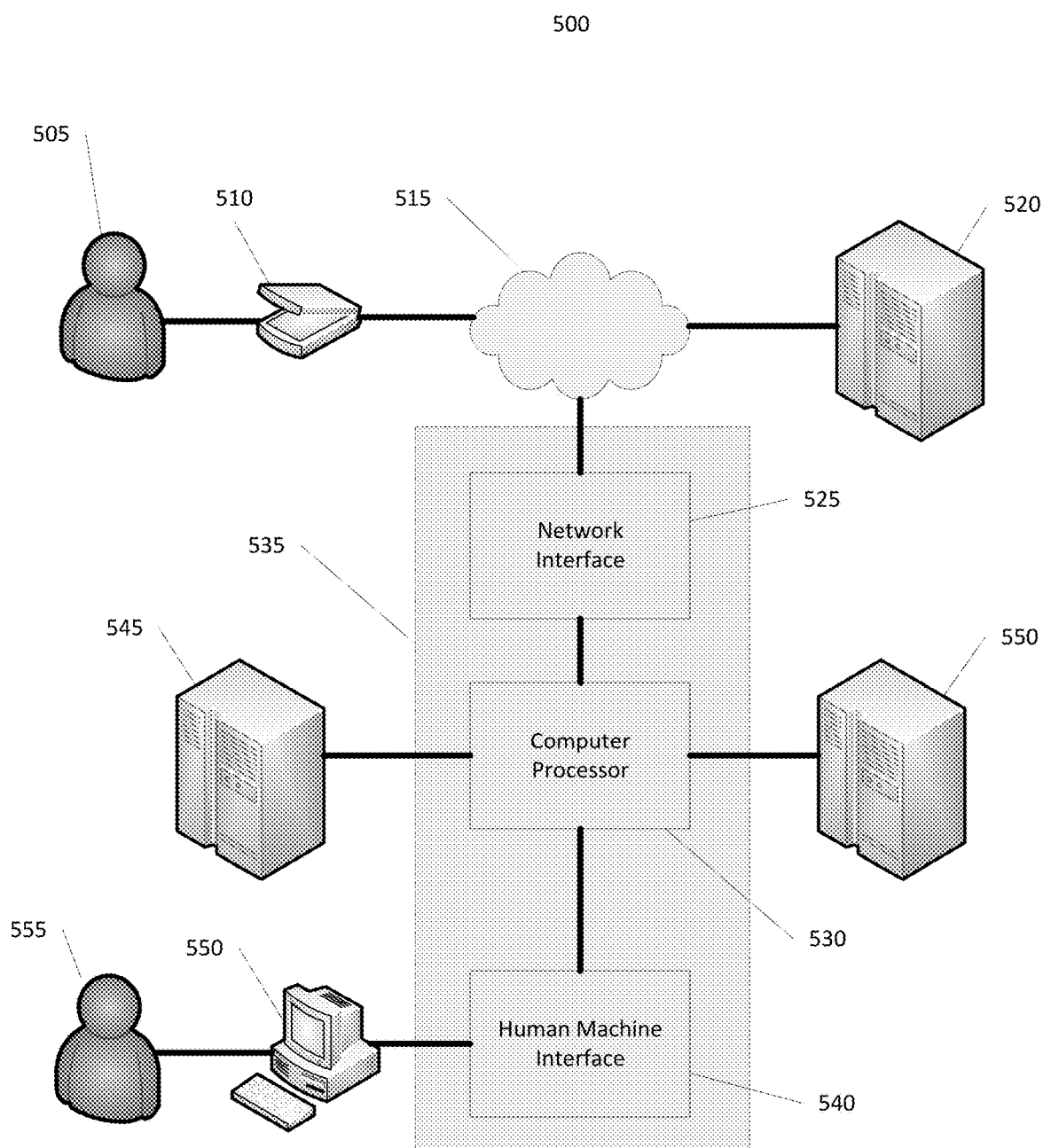
FIG. 5 illustrates an exemplary computer system to validate documents in accordance with one aspect of the present disclosure.

FIG. 5 illustrates a block diagram of an exemplary computer system 500 to perform document verification. The exemplary system 500 enables a user 505, using for example a document scanner 510 to transmit document images over a computer network 515 to a network interface 525. The network 515 may include interfaces to a remote server 520, storing document image data. A customer service representative 555 may interface with a service terminal 550 through a human-machine interface 540 communicatively coupled to a processor 530. The network interface 525, computer processor 530, and human machine interface 540 together may comprise a heuristic engine 535. In other embodiments, the heuristic engine 535 may include a variety of memory devices, interface devices, and processing devices, to execute required functions. The processor 530 may interface to a heuristic server 550 and a transaction server 545.

Figure 6:
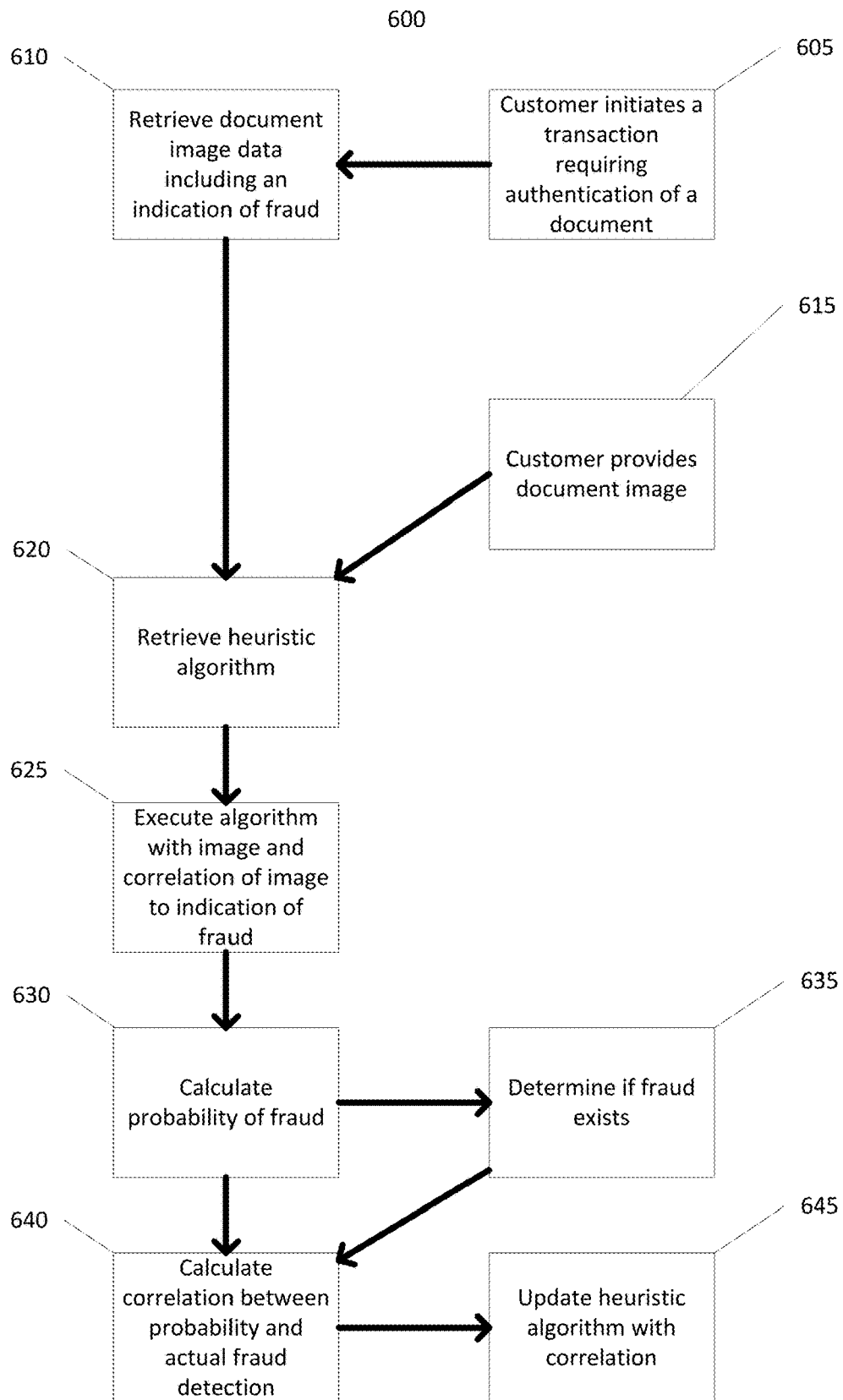
FIG. 6 illustrates an exemplary computer-implemented method to validate documents in accordance with one aspect of the present disclosure.

In accordance with one aspect of the present disclosure, the system 500 may perform the computer-implemented method 600, as illustrated in FIG. 6. However, in one embodiment, the method 600 does not, or may not, specifically require the system 500, nor do the elements included therein require a particular arrangement, to perform the method steps illustrated in the process 600.

Method 600 may include, in one embodiment, a customer such as the user 505 of FIG. 5, initiates a transaction requiring authentication of a document (block 605). The processor 530, for example, may retrieve document image data from, the remote server 520 or the transaction server 545 in some embodiments (block 610). The user 505 may in some embodiments provide a document image (block 615), and the processor 530 may retrieve (block 620) a heuristic algorithm, for example from the heuristic server 550. The processor 530 may execute the algorithm with the image data and a correlation of the image to an indication of fraud (block 625). In one embodiment, the processor 530 (block 630) may calculate a probability of fraud, and prompt the user 505.

A service representative 555 may determine if fraud exists (block 635), and the processor may calculate a correlation between the probability of fraud and an actual fraud detection (block 640). The processor 530 may update the algorithm stored in the heuristic server 550 with the calculated correlation (block 645).

FRAUD DETECTION

Figure 7:
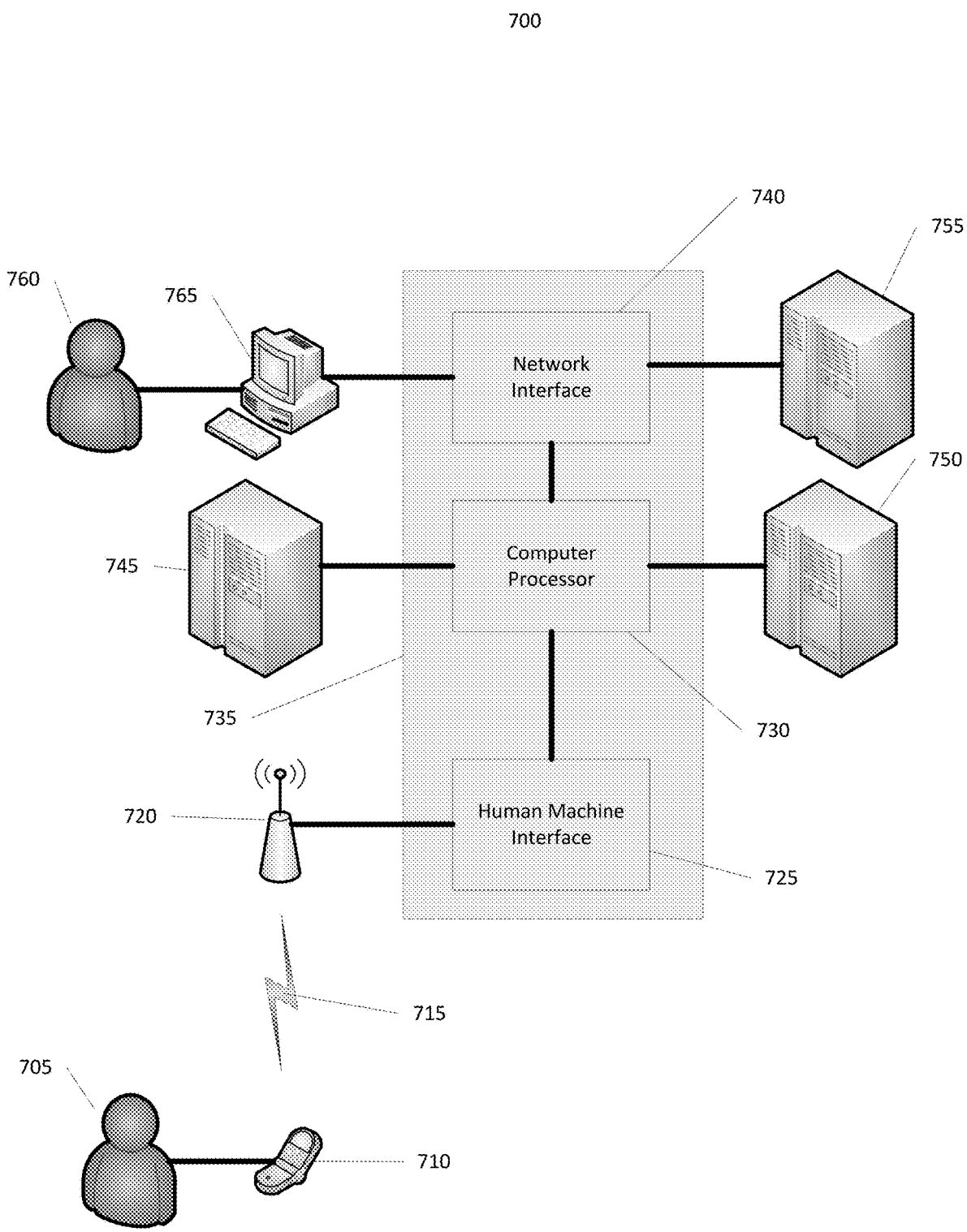
FIG. 7 illustrates an exemplary computer system to detect fraud in accordance with one aspect of the present disclosure.

FIG. 7 illustrates a block diagram of an exemplary computer system 700 to perform fraud detection based upon past instances of fraud. The exemplary system 700 enables a user 705, using for example a cellular telephone 710 to initiate a transaction that may or may not be fraudulent. The cellular telephone 710 may wirelessly communicate to a wireless access point 720, via a wireless protocol 715 to a human machine interface 725. A customer service representative 760 may use a customer service terminal 765 to communicate with the user and receive data. The service terminal 765 may, in one embodiment, communicatively couple to a network interface 740. The network interface 740 may interface to a remote server 755, for example storing fraud instance data in one embodiment. The network interface 740 and human-machine interface 725 may communicatively couple to a processor 730, that together comprise a heuristic engine 735 in one embodiment. In other embodiments, the heuristic engine 735 may include a variety of memory devices, interface devices, and processing devices, to execute required functions. The computer processor 730 may interface to a heuristic server 750 and a transaction server 745.

Figure 8:
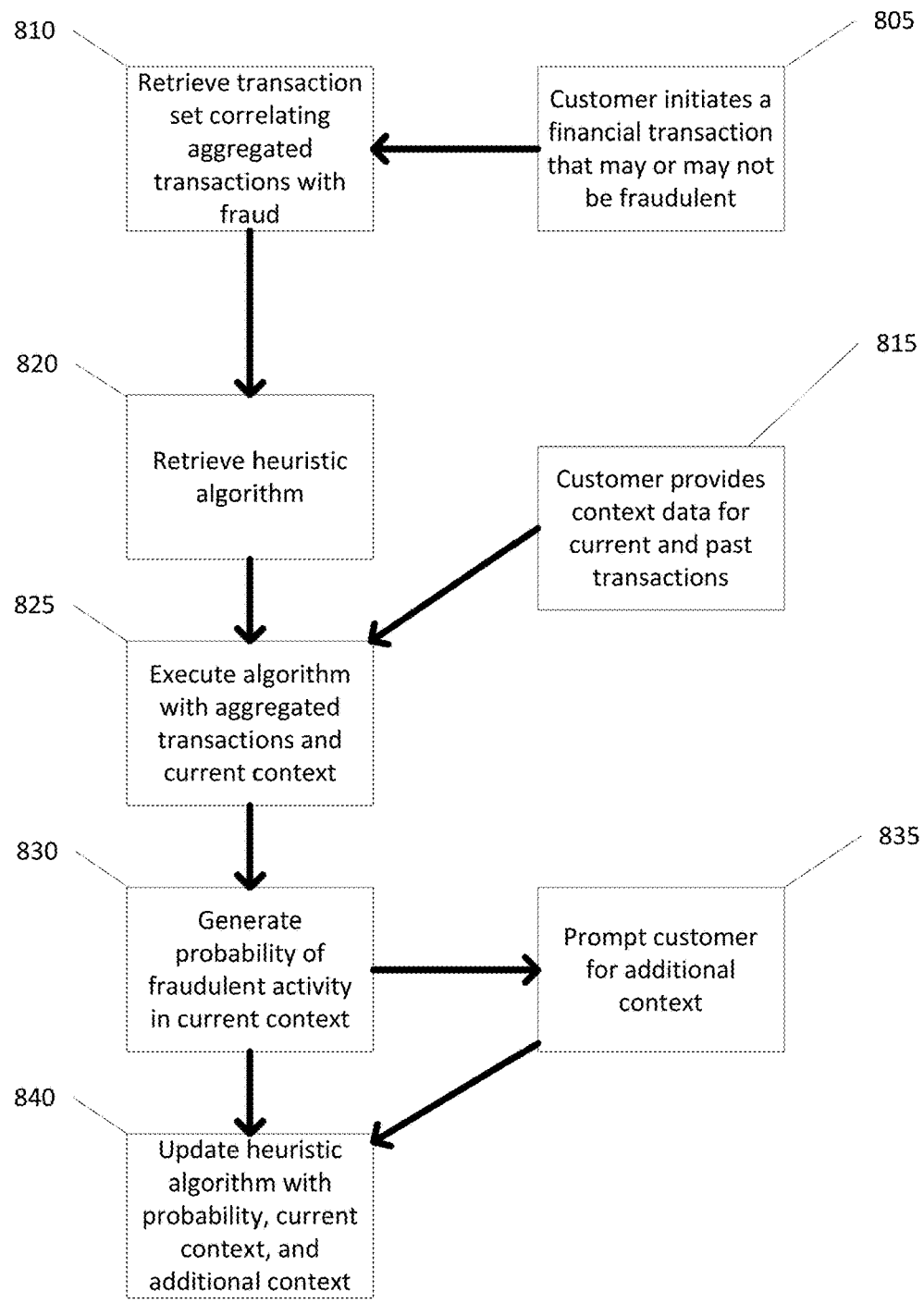
FIG. 8 illustrates an exemplary computer-implemented method to detect fraud in accordance with one aspect of the present disclosure.

In accordance with one aspect of the present disclosure, the system 700 may perform the computer-implemented method 800, as illustrated in FIG. 8. However, in one embodiment, the method 800 does not, or may not, specifically require the system 700, nor do the elements included therein require a particular arrangement, to perform the method steps illustrated in the process 800.

The method 800 includes a user, for example the user 705 of FIG. 7, that initiates a financial transaction that may or may not be fraudulent (block 805). The processor 730 may retrieve a transaction set correlating aggregated transactions from a plurality of users for example, with indications of fraud (block 810). In one embodiment, the processor 730 (block 820) may retrieve a heuristic algorithm. A user or customer may provide context data for current and past transactions (block 815), for example with the cellular telephone 710.

In one embodiment, the processor 730 may execute the algorithm with the aggregated transactions and a current context. The processor 730 may generate a probability of fraudulent activity in a current context (block 830). In another embodiment, the service representative 750 may prompt the customer 705 for additional context, for example related to the transaction being processed. The processor 730 may update the heuristic algorithm stored in the heuristic server 750 with the probability (block 840), the current context, and any additional context available.

Figure 9:
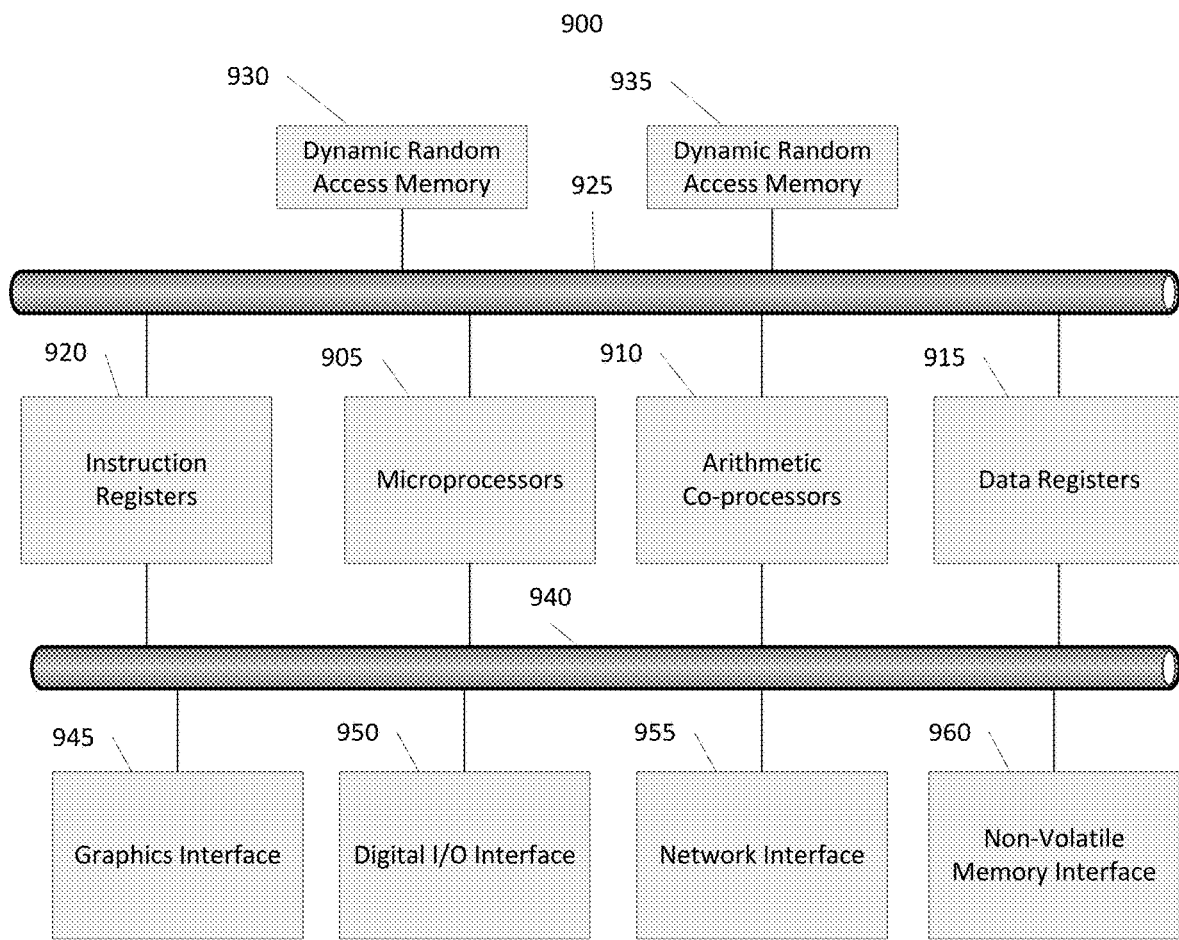
FIG. 9 illustrates an exemplary computing system to in accordance with one aspect of the present disclosure.

FIG. 9 illustrates an exemplary computing system 900 in accordance with the embodiments disclosed in FIGS. 1-8 and 10. The exemplary computing system 900 and components disclosed therein may comprise part, all, or none of the disclosed embodiments of FIGS. 1-8 and 10. The system 900 includes one or more microprocessors 905, coupled to supporting devices through multi-access busses 925 and 940. Dynamic random access memory 930 and 935 may interface to data bus 925, and store data used by the one or more microprocessors 905. The system 900 includes instruction registers 920 that store executable instructions for the one or more microprocessors 905, and data registers 915 that store data for execution. In some embodiments, the system 900 includes one or more arithmetic co-processors 910, to assist or supplement the one or more microprocessors 905.

Data bus 940 includes interfaces to a graphics interface 945 that may in some embodiments process and transmit graphical data for a user on a display or similar devices. Likewise, data bus 940 includes interfaces for a digital I/O interface that processes and transmits, for example, keyboard, pointing device, and other digital and analog signals produced and consumed by users or other machines. A network interface 955 processes and transmits encoded information over wired and wireless networks to connect the system 900 to other machines and users. Data bus 940 also includes at least one interface to a non-volatile memory interface, that may process and transmit data that resides on non-volatile memory devices.

Figure 10:
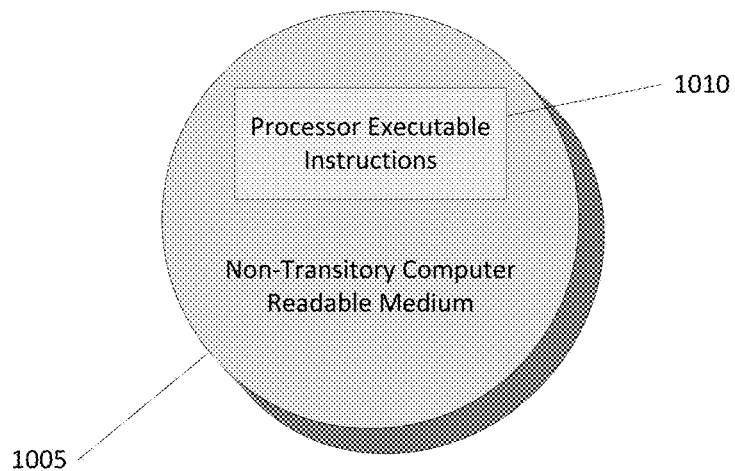
FIG. 10 illustrates an exemplary article of manufacture in accordance with one aspect of the present disclosure.

FIG. 10 illustrates a non-transitory computer readable medium 1005, that comprises processor executable instructions 1010. Such processor executable instructions may include instructions executed by the one or more processors 905 of FIG. 9.

MACHINE LEARNING AND OTHER MATTERS

In certain embodiments, the heuristic engine and algorithms discussed herein may include machine learning, cognitive learning, deep learning, combined learning, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more tokenized icons from user device details, user request or login details, user device sensors, geolocation information, image data, the insurer database, a third-party database, and/or other data.

In one embodiment, a processing element (and/or heuristic engine or algorithm discussed herein) may be trained by providing it with a large sample of images and/or user data with known characteristics or features. Based upon these analyses, the processing element may learn how to identify characteristics and patterns that may then be applied to analyzing user device details, user request or login details, user device sensors, geolocation information, image data, the insurer database, a third-party database, and/or other data. For example, the processing element may learn, with the user's permission or affirmative consent, to identify the user and/or the asset that is to be the subject of a transaction, such as generating an insurance quote or claim, opening a financial account, handling a loan or credit application, processing a financial (such as a credit card) transaction or the like.

ADDITIONAL CONSIDERATIONS

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The processors, transceivers, mobile devices, service terminals, servers, remote servers, database servers, heuristic servers, transaction servers, and/or other computing devices discussed herein may communicate with each via wireless communication networks or electronic communication networks. For instance, the communication between computing devices may be wireless communication or data transmission over one or more radio links, or wireless or digital communication channels.

Customers may opt into a program that allows them share mobile device and/or customer, with their permission or affirmative consent, with a service provider remote server. In return, the service provider remote server may provide the functionality discussed herein, including security, fraud, or other monitoring, and generate recommendations to the customer and/or generate alerts for the customers in response to abnormal activity being detected.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to improvements to computer functionality, and improve the functioning of conventional computers.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method, executed by one or more processors, for training a heuristic algorithm to generate an indication of fraudulent transaction activity within a financial account, comprising:

retrieving, by the one or more processors and from a first memory, an unstructured transaction set comprising aggregated transaction data from plurality of users and at least one indication of fraudulent transaction activity;

receiving, by the one or more processors, an indication of a pending financial transaction from a network interface device;

receiving, by the one or more processors and from a user of the plurality of users via a human machine interface, natural language context data for the pending financial transaction and past transactions;

accessing, by the one or more processors, the heuristic algorithm stored in a second memory;

executing, by the one or more processors, the heuristic algorithm, to generate a predicted probability of fraudulent account activity using the unstructured transaction set, the natural language context data, and the indication of the pending financial transaction;

prompting, by the one or more processors and based at least in part on the predicted probability of fraudulent activity, the user to provide additional context data for the pending financial transaction;

receiving, by the one or more processors, the additional context data from the user; and training, by the one or more processors, the heuristic algorithm using the predicted probability of fraudulent account activity, the natural language context data, and the additional context data.

2. The computer-implemented method of claim 1, wherein the at least one indication of fraudulent transaction activity comprises an unauthorized withdrawal.

3. The computer-implemented method of claim 1, wherein the predicted probability of fraudulent account activity corresponds to an unauthorized credit transaction.

4. The computer-implemented method of claim 1, wherein the unstructured transaction set further comprises one or more past transactions related to at least one account.

5. The computer-implemented method of claim 1, wherein the first memory comprises an external transaction server.

6. The computer-implemented method of claim 1, wherein the second memory comprises an external heuristic server.

7. The computer-implemented method of claim 1, further comprising updating, by the one or more processors, the heuristic algorithm stored in the second memory using the predicted probability of fraudulent account activity.

8. A computer system configured to train a heuristic algorithm to generate an indication of fraudulent transaction activity within a financial account, the computer system comprising at least one of one or more processors or one or more transceivers configured to:

retrieve, from a first memory, an unstructured transaction set comprising aggregated transaction data for a plurality of users, including at least one indication of fraudulent transaction activity associated with one or more users of the plurality of users;

receive an indication of a pending financial transaction from a network interface device;

receive, from a user of the plurality of users, natural language context data for the pending financial transaction and past transactions;

access the heuristic algorithm stored in a second memory;

execute the heuristic algorithm to generate a predicted probability of fraudulent account activity using the unstructured transaction set, the natural language context data, and the indication of the pending financial transaction;

prompt, based at least in part on the predicted probability of fraudulent account activity, the user to provide additional context data for the pending financial transaction;

receive the additional context data from the user; and train the heuristic algorithm using the predicted probability of fraudulent account activity, the natural language context data, and the additional context data.

9. The computer system of claim 8, wherein the at least one indication of fraudulent transaction activity comprises an unauthorized withdrawal.

10. The computer system of claim 8, wherein the at least one indication of fraudulent transaction activity comprises an unauthorized credit transaction.

11. The computer system of claim 8, wherein the unstructured transaction set further comprises one or more past transactions related to at least one account.

12. The computer system of claim 8, wherein the first memory comprises an external transaction server.

13. The computer system of claim 8, wherein the second memory comprises an external heuristic server.

14. A non-transitory computer readable medium, comprising computer readable instructions that, when executed, cause one or more processors to:

retrieve, from a first memory, an unstructured transaction set comprising aggregated transaction data for a plurality of users and at least one indication of fraudulent transaction activity;

receive an indication of a pending financial transaction from a network interface device;

receive, from a user of the plurality of users via a human machine interface, natural language context data for the pending financial transaction and past transactions;

access a heuristic algorithm stored in a second memory;

execute the heuristic algorithm to generate a predicted probability of fraudulent account activity using the unstructured transaction set, the natural language context data, and the indication of the pending financial transaction;

prompt, based at least in part on the predicted probability of fraudulent account activity, the user to provide additional context data;

receive the additional context data from the user; and train the heuristic algorithm using the predicted probability of fraudulent account activity, the natural language context data, and the additional context data.

15. The non-transitory computer readable medium of claim 14, wherein the at least one indication of fraudulent transaction activity comprises an unauthorized withdrawal.

16. The non-transitory computer readable medium of claim 14, wherein the at least one indication of fraudulent transaction activity comprises an unauthorized credit transaction.

17. The non-transitory computer readable medium of claim 14, wherein the unstructured transaction set further comprises one or more past transactions related to at least one account.

18. The non-transitory computer readable medium of claim 14, wherein the first memory comprises an external transaction server.

19. The non-transitory computer readable medium of claim 14, wherein the second memory comprises an external heuristic server.

20. The non-transitory computer readable medium of claim 14, wherein the computer readable instructions, when executed, further cause the one or more processors to:

update the heuristic algorithm stored in the second memory using the predicted probability of fraudulent account activity.

* * * * *

UNITED STATES PATENT AND TRADEMARK OFFICE
CERTIFICATE OF CORRECTION

PATENT NO. : 10,810,593 B1
APPLICATION NO. : 15/495659
DATED : October 20, 2020
INVENTOR(S) : Elizabeth Flowers et al.

It is certified that error appears in the above-identified patent and that said Letters Patent is hereby corrected as shown below:

In the Specification

Column 1, Line 9, change "respectively on May 12 , 2016 and May 17 , 2016 , and U.S." to --respectively on May 17, 2016 and May 12, 2016, and U.S.--

Signed and Sealed this
Third Day of February, 2026

John A. Squires
*Director of the United States Patent and Trademark Office*